Patented Jan. 16, 1923.

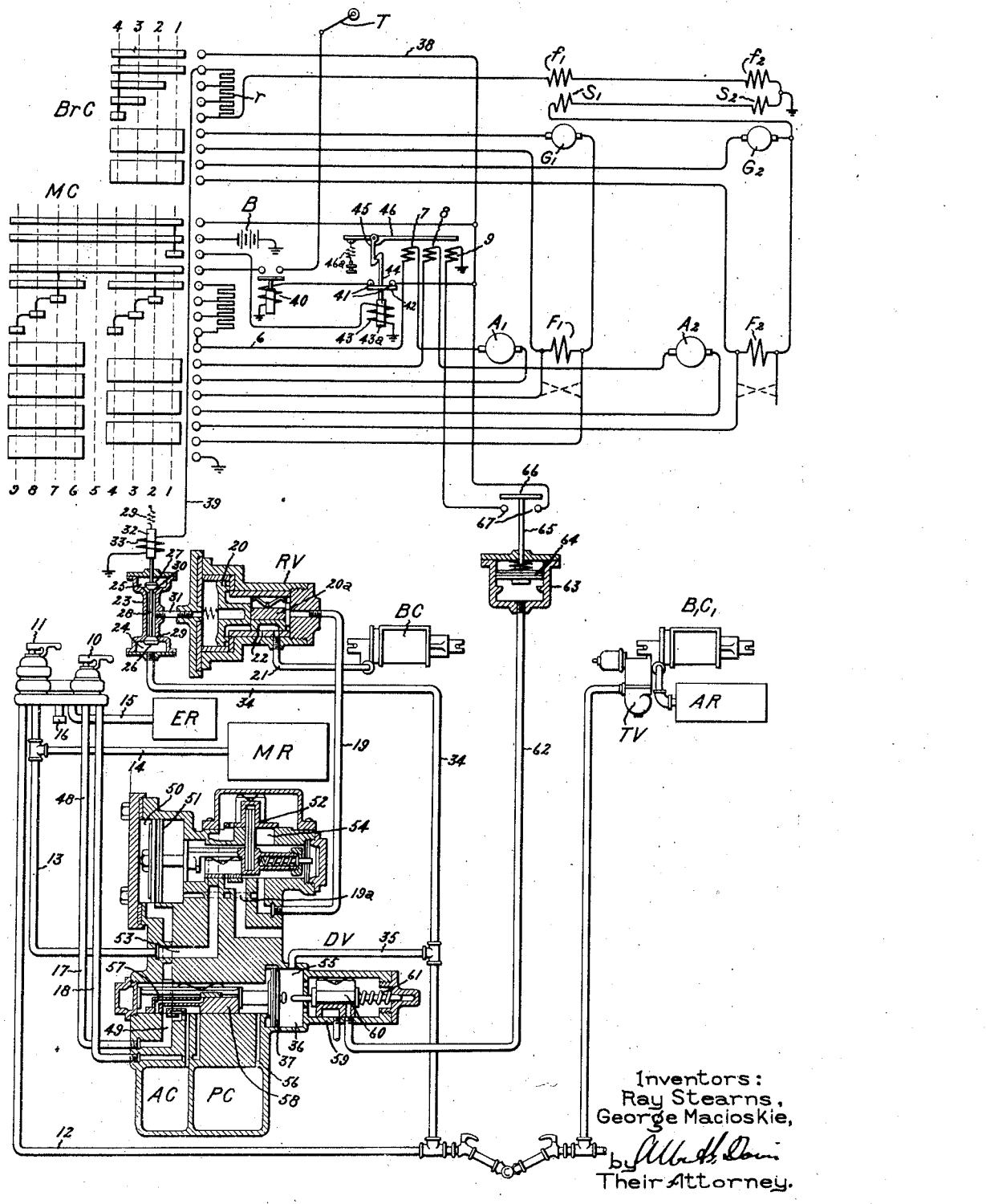

1,442,286

UNITED STATES PATENT OFFICE.

GEORGE MACLOSKIE, OF ERIE, PENNSYLVANIA, AND RAY STEARNS, OF SCHENECTADY, NEW YORK, ASSIGNORS TO GENERAL ELECTRIC COMPANY, A CORPORATION OF NEW YORK.

BRAKING SYSTEM.

REISSUED

Application filed April 18, 1918. Serial No. 229,430.

*To all whom it may concern:*

Be it known that we, GEORGE MACLOSKIE and RAY STEARNS, citizens of the United States, residing, respectively, at Erie, county of Erie, State of Pennsylvania, and at Schenectady, county of Schenectady, State of New York, have invented certain new and useful Improvements in Braking Systems, of which the following is a specification.

Our invention relates to the braking of a train unit, such as an electrical locomotive, and particularly to the combination of an electric brake, such as a regenerative braking system and an air brake system for producing the braking effect, and our invention has for its object the provision of an improved system of this character.

It is sometimes advantageous to employ both a regenerative braking system and an air brake system for braking a train unit, such as an electric locomotive, for the reason that the regenerative braking system produces its maximum braking effect when the train is running at a fairly high rate of speed, but produces only a slight braking effect at low speeds. Furthermore, the regenerative braking system does not consume the braking energy but rather returns it to the line. The air brake system on the other hand operates more effectively at low than at high speed, and is better adapted to bring the train unit to a stop than is the regenerative braking system. The regenerative braking system, therefore, can be used to good advantage when the train is running at fairly high speeds and is particularly advantageous in braking the train on a down grade while the air brake can be used to best advantage in bringing the train to a stop.

In accordance with our invention, a train unit is equipped with both an electric brake, which may, for example, be a regenerative braking system, and with an air brake of any well known type but usually of the type that includes a distributing valve, and while either of the brakes may be freely operated, our invention provides for improving the braking effect obtained by the two systems by so interlocking the two brakes that, in general, both brakes may not be applied simultaneously.

Briefly it may be stated that the following results are obtained in accordance with our invention.

An application of the electric braking makes the air brakes on the locomotive inoperative so far as a service application is concerned. In case a service application of the air brakes has already been made, then if the electric braking is applied, the air brakes on the locomotive are released but remain applied on the remainder of the train. In case the electric brakes are first applied, it is impossible to make a service application of the air brakes on the locomotive, though they may be applied on the remainder of the train.

Our invention so far described produces in general the same results as are produced in the system disclosed in our prior application, Serial No. 150,939, which was filed in the United States Patent Office February 26, 1917. In the system there described, however, it is possible to make an emergency application of the air brakes on the locomotive simultaneously with an application of the electric braking. Such simultaneous application of the two braking systems may result, however, in the slipping of the wheels, and in accordance with our present invention it is impossibly simultaneously to apply the two braking systems even under emergency conditions. It is always possible to make an emergency application of the air brakes but such application makes the electric braking inoperative. If the electric braking is first applied, an emergency application of the air brakes results in releasing the electric braking, while if an emergency application of the air brakes has first been made, an attempt to apply the electric braking is ineffective.

Our invention will best be understood by reference to the accompanying drawing, the single figure of which discloses one embodiment of our invention.

Referring now to the drawing, $A_1$ and $A_2$ are the usual motors with which the electric locomotive, in connection with which we have illustrated our invention, is provided. The motors are provided with series fields $F_1$ and $F_2$, the motors and fields being controlled by a master controller MC in the usual manner, the contactors and associated parts being omitted for the sake of simplicity. Exciter generators for superexciting the fields $F_1$ and $F_2$ of the motors, when the latter are to act as generators and return energy to the line, are provided, the armatures being indicated by the reference numerals $G_1$ and $G_2$. The exciter generators are provided with series fields $S_1$ and $S_2$, respectively, and shunt fields $f_1$ and $f_2$, the latter being under the control of a braking controller BrC and when the master controller is in any operating position and the braking controller is moved to the first notch, are connected to a source of energy such as a battery B. A resistance $r$ is included in series with the shunt fields $f_1$ and $f_2$ and is gradually cut out in an obvious manner as the braking controller is moved towards the full braking position. The motors are supplied with energy from a trolley T, through a circuit which, with the master controller in position to connect the motor armatures in series, may be traced as follows: trolley, contactor, master controller, conductor 6, tripping coil 7, armature of the motor $A_1$, master controller MC, tripping coil 8, armature of the motor $A_2$, master controller, series field $F_1$, master controller, series field $F_2$ and through the exciter generator series fields $S_1$ and $S_2$ to ground. The circuits established by the master controller in positions connecting the motor armatures in parallel will be apparent to those skilled in the art and need not be further described. Now as soon as the braking controller is moved to the first position, the circuits for the armatures of the exciter generators $G_1$ and $G_2$, which are connected in shunt to the series fields $F_1$ and $F_2$, respectively, are closed, as is the circuit from the battery B through the shunt fields $f_1$ and $f_2$. The series fields $F_1$ and $F_2$ of the motors accordingly may be superexcited and cause the motors to act as generators and return energy to the line.

The air brake system, in connection with which we have disclosed our invention, comprises a distributing valve DV of a well known type, with which are associated the engineer's independent brake valve 10, by which the air brakes may be applied only on the electric locomotive or other train unit with which the distributing valve is associated and an automatic brake valve 11, by means of which the air brakes may be applied on the entire train. The usual brake pipe, indicated by the reference numeral 12, is connected to the automatic valve as is a pipe 13 which connects the automatic valve to the distributing valve, the pipe 13 being connected to the main reservoir MR by a pipe 14. The equalizing reservoir ER is connected to the brake valves by a pipe 15. The exhaust pipe for the valves is indicated by the numeral 16. The application cylinder pipe is indicated by the reference numeral 17 and the distributing valve release pipe by the numeral 18. The distributing valve is provided with the usual pressure chamber PC and application chamber AC. It is believed that the various parts of the distributing valve may best be described in connection with the operation of the system and the designation of these parts will accordingly be reserved until such description is recited.

A release valve RV, which is connected to the distributing valve by a pipe 19, is provided for preventing a service application of the air brakes on the locomotive or other train unit with which the distributing valve is associated when an application of the electric braking has been made. The construction and operation of this valve is the same as that described in our prior application above referred to. The release valve is provided with a piston 20 which actuates a slide valve $20^a$, the seat of which is provided with an opening communicating with the brake cylinder BC by a pipe 21 and also provided with an opening communicating with the atmosphere through a port 22. The operation of the release valve is controlled by a valve 23 formed with chambers 24 and 25 at the lower and upper ends, respectively, within which are disposed valves 26 and 27 connected by a valve stem 28. The valves 26 and 27 cooperate with valve seats 29 and 30. A space is provided within the valve casing surrounding the valve stem 28 which communicates, by means of a pipe 31, with the piston chamber of the release valve RV. The valve stem 28 is connected to an armature 32 which is actuated by a coil 33. The lower chamber 24 of the control valve 23 is connected to the brake pipe 12 by a pipe 34. The pipe 34 is connected by a branch pipe 35 to the piston chamber 36 of the equalizing piston 37 of the distributing valve. The piston chamber is, therefore, charged with brake pipe pressure. The brake cylinder on the locomotive is indicated by the reference letters BC. At the right of the figure is shown the air brake equipment of one of the cars, $B_1$ C, being the brake cylinder, AR the auxiliary reservoir and TV the triple valve. This equipment and other similar equipments with which the train is furnished, operate in the usual and well understood manner.

The coil 33 governing the action of the control valve 23 is in turn controlled by the braking controller BrC, and when the latter is moved to the first position, a circuit is closed from the battery B through the braking controller, conductor 39 to coil 33 and to the ground. The main power circuit from the trolley T is controlled by a normally energized magnet 40, the armature of which carries a bridging member which normally engages contacts included in the power circuit. A pair of contacts 41 are included in the circuit of the coil 40 and are normally bridged by a member 42. This member is carried by a stem 44 attached to an armature 43ª, the latter being raised by a reset coil 43 which is under the control of the braking master controller MC. The stem 44 is provided with a latch which normally engages a latch on a pivoted arm 45 which holds the member 42 in an elevated position, thereby maintaining the circuit to the coil 40 closed. The tripping latch 45 is actuated by a lever 46 cooperating with a tripping coil 9, the circuit for which is closed in a manner that will be more fully hereinafter described. The latch of the arm 45 is normally held in engagement with the latch on the stem 44 by a spring 46ª.

In order to make a service application of the air brakes on the locomotive only, the engineer moves the handle of the independent valve 10 to the service position at which time the main reservoir is connected through the brake valve 10 and pipe 48 to the passage 49 of the distributing valve. This passage communicates with the application piston chamber 50 and with the application chamber AC. The application piston 51 is moved to the right and with it the application valve 52, thereby opening communication between the main reservoir and pipe 19 as follows: pipes 14 and 13, passage 53 of the distributing valve to the space above the application valve 52. At this time the opening 54 beneath the application slide valve is uncovered thus opening communication to the pipe 19. The piston 20 of the release valve is thereby moved to the left and pressure is admitted from the pipe 19 to the brake cylinder thereby making an independent application of the brakes on the locomotive. Pressure continues to build up in the brake cylinder until the pressure therein slightly exceeds that on the opposite side of the application piston of the distributing valve, when the application piston will be moved to the left, thereby closing the opening from the chamber above the application valve to the pipe 19. At this time, however, the piston does not move to the left sufficiently far to uncover the exhaust opening from the distributing valve, and the pressure is thus maintained in the brake cylinder. A passage 19ª connects the pipe 19 to the application chamber of the distributing valve. This is for the purpose of recharging the brake cylinder in case of leakage therein or the parts connected thereto. In case such a leakage and a corresponding reduction in pressure takes place, a reduction will occur on the right-hand side of the application piston which will accordingly be moved to the right, thereby recharging the brake cylinder in the same manner as previously described. It will, of course, be understood that a slow independent application or a quick independent application of the air brakes may be made by moving the independent valve to the corresponding positions in a manner well understood in the art.

Now when the electric brakes are applied, the coil 33, controlling the valve 23, is energized in the manner heretofore described, the valve stem 28 is moved downwardly thereby closing the valve opening 30 and opening a passage from the brake pipe through the chamber 24, valve opening 29, to the passage around the valve stem 28. In case a service application of the air brakes on the locomotive has first been made, brake pipe pressure is admitted to the left of the release valve piston 20 thereby moving it to the right and connecting the brake cylinder to the atmosphere through the port 22 and thereby releasing the brakes. In case the electric braking has first been applied, any attempt to make a service application of the air brakes on the locomotive will be ineffective, since the brake pipe pressure will be sufficient to hold the piston of the release valve to the right of the position shown in the drawing.

It is understood, of course, that the brake pipe is normally connected to the pressure cylinder of the distributing valve through the pipes 34 and 35, the latter being connected to the front of the equalizing piston. With the equalizing piston in the normal position shown in the drawing, air leaks through the feed groove 55 around the piston 37 and through the port 56 to the pressure cylinder. Now when an automatic application of the brakes of the entire train is to be made, the automatic valve is moved to the service position and air is exhausted from the brake pipe in the usual manner. This causes a reduction of pressure in the equalizing piston chamber, and the pressure in the pressure chamber causes the equalizing piston 37 to be moved to the right, and this movement brings a port 57 in the equalizing slide valve 58 into communication with the passage 49 of the distributing valve. Pressure from the pressure cylinder PC is thus admitted to the passage 49 and to the application piston chamber 50, thereby bringing about a service application of the air brakes on the locomotive in the same manner as was produced in response to the movement of the independent valve to the service position. It will, of course, be understood that a service application of the air brakes on the entire train will be made in the usual manner.

In order to make the electric braking inoperative when an automatic emergency application of the air brakes has been made, a cylinder 59 is attached to the distributing valve, and is here shown as integral therewith. This cylinder communicates with the front of the equalizing piston, and therefore with the brake pipe, and is provided with a slide valve 60 which is normally held in the position indicated in the figure, by a spring 61 in the same manner as an ordinary slide valve. A pipe 62 connects the cylinder 59 with a cylinder 63, the latter being provided with a piston 64. The piston stem 65 carries a member 66 which, when the piston is in its lower position, bridges two stationary contacts 67 which control the circuit to the tripping coil 9. When the slide valve 60 is in the position indicated in the drawing, the space beneath the piston of the cylinder 63 communicates through a port in the slide valve 60 with the interior of the cylinder 59 and thus with the brake pipe, and the piston 64 is thus normally held in an elevated position, thus maintaining the bridging member 66 out of engagement with the stationary contacts 67. When an automatic service application of the air brakes is made, the equalizing piston does not move to the right sufficiently to engage the stem which projects inwardly from the slide 60. When an automatic emergency application of the brakes is made, however, the equalizing piston engages the stem and moves the slide valve 60 to the right thereby opening communication, through a recess in the slide valve, between the pipe 62 and the atmosphere and permitting the piston 64 to descend through the action of the coil spring above the same. The bridging member 66 is thus brought into engagement with the stationary contacts 67 and a circuit is closed from the battery B, braking controller, conductor 38, contacts 67, bridging member 66 through the tripping coil 9. The latch 45 thereby releases the latch of the stem 44 and opens the switch which controls the contactor 40. The latter is thereby deenergized and opens the main power circuit thus cutting out the motors and, of course, disabling the electric braking. The same result will be produced by an overload on either of the armatures $A_1$ or $A_2$ which will operatively energize the respective coils 7 and 8 and trip the contactor controlling the power circuit as before.

It will also be observed that after the electric brake has been released, the master controller MC must be returned to the first position before the line contactor 40 can be again energized to close. The connection of the electric motors of the vehicle to the line is thus prevented until the proper conditions have been brought about. This insures that there will not be a rush of current from the line due to the fact that the motors are not operating so as to generate a voltage to oppose the line voltage. By returning the controller to the first position, the motors may be operated as motors or as braking generators without danger to the motors or the vehicle equipment.

While we have described our invention as embodying a concrete structure and as operating in a specific manner in accordance with the provisions of the patent statutes, it should be understood that we do not limit our invention thereto, since various modifications thereof will suggest themselves to those skilled in the art without departure from the spirit of our invention, the scope of which is set forth in the annexed claims.

What we claim as new and desire to secure by Letters Patent of the United States, is,—

1. The combination with an electric braking system and an air brake system, the latter including a valve mechanism, said valve mechanism being provided with a member movable in response to an emergency application of the air brakes, and means responsive to the movement of said member for making the electric braking system inoperative.

2. The combination with an electric braking system and an air brake system, the latter including a distributing valve, of means responsive to the movement of the equalizing piston of the distributing valve to emergency position for making the electric braking system inoperative.

3. The combination with an electric braking system and an air brake system, the latter including a distributing valve, of means for preventing a service application of the air brakes while the electric braking is applied, and means responsive to the movement of the equalizing piston of the distributing valve to emergency position for making the electric braking system inoperative.

4. The combination with an electric braking system and an air brake system, the latter including a distributing valve, a cylinder attached to the distributing valve and communicating with the brake pipe side of the equalizing piston, a valve disposed in said cylinder and operated in response to the movement of the equalizing piston to the emergency position, and means responsive to the movement of said valve for making the electric braking inoperative.

5. The combination with an electric braking system and an air brake system, the latter comprising a distributing valve, of a pneumatically operated device normally connected to the brake pipe for controlling the electric braking system, and means associated with the equalizing valve of the distributing valve for disconnecting said pneumatic device from the brake pipe and connecting it to atmosphere.

6. The combination with an electric braking system and an air brake system comprising a distributing valve, of means for preventing the simultaneous application of the electric braking and a service application of the air brakes, a pneumatically operated device normally connected to the brake pipe for controlling the electric braking system, and means responsive to the movement of the equalizing piston of the distributing valve to the emergency position for disconnecting said pneumatic device from the brake pipe and connecting it to the atmosphere.

7. The combination with an air brake system and an electric braking system, of a controller having a plurality of operative positions for controlling the electric braking system, switch mechanism operated responsively to an application of the air brakes for releasing the electric brake, and connections whereby after an application of the air brake the said controller must be returned to a predetermined position before the electric brake can be again applied.

In witness whereof, GEORGE MACLOSKIE has hereunto set his hand this 13th day of April, 1918, and RAY STEARNS has hereunto set his hand this 16th day of April, 1918.

GEORGE MACLOSKIE.
RAY STEARNS.